(12) United States Patent
Boertje et al.

(10) Patent No.: US 7,040,346 B2
(45) Date of Patent: May 9, 2006

(54) FLUID POWER VALVE AND INTEGRATED VISUAL INDICATOR

(75) Inventors: Marcus J. M. Boertje, Port Washington, NY (US); Frank J. Langro, Port Washington, NY (US); Michael Zona, Melville, NY (US)

(73) Assignee: Festo Corporation, Hauppauge, NY (US)

( * ) Notice: Subject to any disclaimer, the term of this patent is extended or adjusted under 35 U.S.C. 154(b) by 342 days.

(21) Appl. No.: 10/628,873

(22) Filed: Jul. 28, 2003

(65) Prior Publication Data

US 2005/0022877 A1 Feb. 3, 2005

(51) Int. Cl.
*F16K 37/00* (2006.01)
*F21V 33/00* (2006.01)

(52) U.S. Cl. .................. 137/554; 137/884; 362/96; 362/612

(58) Field of Classification Search ................ 137/269, 137/271, 554, 883, 884; 362/96, 600, 612
See application file for complete search history.

(56) References Cited

U.S. PATENT DOCUMENTS

| | | | | |
|---|---|---|---|---|
| 3,717,171 A | | 2/1973 | Fawkes | |
| 4,308,891 A | * | 1/1982 | Loup | 137/551 |
| 4,418,720 A | * | 12/1983 | Day et al. | 137/554 |
| 4,928,730 A | * | 5/1990 | Ando et al. | 137/554 |
| 4,953,590 A | * | 9/1990 | Kakinuma et al. | 137/554 |
| 5,033,012 A | | 7/1991 | Wohld | |
| 5,327,328 A | * | 7/1994 | Simms et al. | 362/612 |
| 5,617,898 A | * | 4/1997 | Nagai et al. | 137/884 |
| 6,053,198 A | * | 4/2000 | Atkin et al. | 137/554 |
| 6,079,441 A | | 6/2000 | Miller et al. | |
| 6,135,147 A | | 10/2000 | Peters et al. | |
| 6,164,323 A | * | 12/2000 | Smith et al. | 137/554 |
| 6,189,565 B1 | | 2/2001 | Skog | |

* cited by examiner

Primary Examiner—John Rivell
(74) Attorney, Agent, or Firm—Hoffman & Baron, LLP

(57) ABSTRACT

A modular fluid power valve assembly having a valve controlling fluid flow from an inlet to an outlet port. The valve can be positioned on a manifold that houses a control assembly used to selectively activate the valve. The control assembly includes a visual indicator to indicate the actuation of the valve. The visual indicator further includes a light source for emitting light. A light pipe is selectively removably attached to the control assembly and valve manifold to allow the light from the light source to be easily seen by the user. The light pipe can be made in a variety of shapes and colors and can be removed by hand for maintenance.

35 Claims, 4 Drawing Sheets

FLUID POWER VALVE AND INTEGRATED VISUAL INDICATOR

BACKGROUND OF THE INVENTION

The present invention relates to fluid power valve assemblies. More specifically, the present invention is directed to a pneumatic valve assembly which includes a visual indicator including a light pipe to indicate actuation of a valve.

Fluid power valves of the prior art are constructed to have a visual indicator. These valve manifolds may include pneumatic valves having a light-emitting diode which is used as a light source to indicate that a particular valve is activated. Typically these valves include a LED positioned on the surface of a housing so that it is visible to the operator. These visual indicators assist in the maintenance and troubleshooting of the valve. The user can easily see whether the valve is actuated by using the visual indicator. However, in some valve arrangements, the LED may be partially obscured or not visible by the user due to its placement directly on the housing.

U.S. Pat. No. 4,418,720 to Day et al. discloses a solenoid operated valve including a light assembly 106 mounted to a valve with a lamp 112 located within an enclosure 114. The light assembly 106 further includes a light pipe 108 and a lens 110 at the opposite end so that the light emitted from the lamp 112 can be transmitted through the light pipe 108 to the lens 110 on the outer surface of the enclosure 114. However, a disadvantage with this design is that the light assembly 106 is connected to the valve assembly and in order to change or replace the lamp 114 or light pipe 108, the outer enclosure 114 must be removed.

Current designs of light pipes for valves are integral with the valve and difficult to replace when needed. The prior art valve design, such as the Day et al. design, uses a light pipe which is permanently installed within the housing 114. Other designs of light pipes are either fixed in place using a permanent glue, press fit or other permanent method thus making replacement of the light pipe difficult and time consuming. In addition, typically the replacement of the light pipe includes the added step of disassembly of the valve itself so that the valve cannot be used, further increasing down time of the equipment.

It would be desirable to provide a valve assembly having a visual indicator that can easily be replaced without the use of tools or disassembly of the valves themselves. It would be further desirable to provide a valve assembly having a modular design where multiple parts can be removed without the need for interrupting the operation of the valve itself.

SUMMARY OF THE INVENTION

The present invention is a fluid power valve assembly having a removable visual indicator for each valve. The valves can be attached to a valve manifold so that multiple valves can be positioned adjacent to each other and the visual indicators associated with each valve can also be seen.

The fluid power valve assembly of the present invention includes at least one pneumatic valve controlling fluid flow from an inlet port to an outlet port. A control assembly can be connected to the pneumatic valve to selectively activate the valve. A light pipe is removably attached to the control assembly and facilitates viewing of a light source to show the activation of the pneumatic valve. It is envisioned that the light pipe can be attached using a friction fit, an interference fit or an accessible snap fit.

The modular pneumatic valve assembly of the present invention can include a manifold. The manifold has at least one valve mounting station where an individual pneumatic valve can be positioned. The manifold can provide a path for both in flow and out flow of fluid to each individual valve if desired. In a preferred embodiment, the manifold can be made of a metallic material such as aluminum or in the alternative a polymer. The manifold can also provide an area for housing the control assembly adjacent the pneumatic valve. It is envisioned that the control assembly is housed in a cavity of the manifold. The manifold can also provide a securing location for holding the light pipe adjacent to the pneumatic valve.

The control assembly can be electrically connected to the pneumatic valve to selectively control the activation of the valve. The control assembly can be a printed circuit board that is connected to a programmable logic controller or similar device. The control assembly also includes a visual indicator. In a preferred embodiment, the visual indicator includes a light source that can be a light emitting diode connected to the control assembly to indicate that the pneumatic valve is activated.

The modular pneumatic valve assembly of the present invention further includes a light pipe. The light pipe is preferably selectively removably attached to the control assembly and allows light to travel from the light emitting diode to a greater surface area. In a preferred embodiment the light pipe is held in a holder which provides a securing location adjacent to the pneumatic valve. The light pipe can be made of a translucent plastic or glass material.

In a more preferred embodiment, the light pipe has a stem portion positioned adjacent to the light emitting diode to allow the light from the light emitting diode to travel through the light pipe. The stem portion is connected to an upper display portion which provides a large surface area to indicate that the light emitting diode is activated.

For a better understanding of the present invention, reference is made to the following detailed description to be read in conjunction with the accompanying drawings and the scope will be defined in the appended claims.

DETAILED DESCRIPTION OF THE PREFERRED EMBODIMENTS

Figure 1:
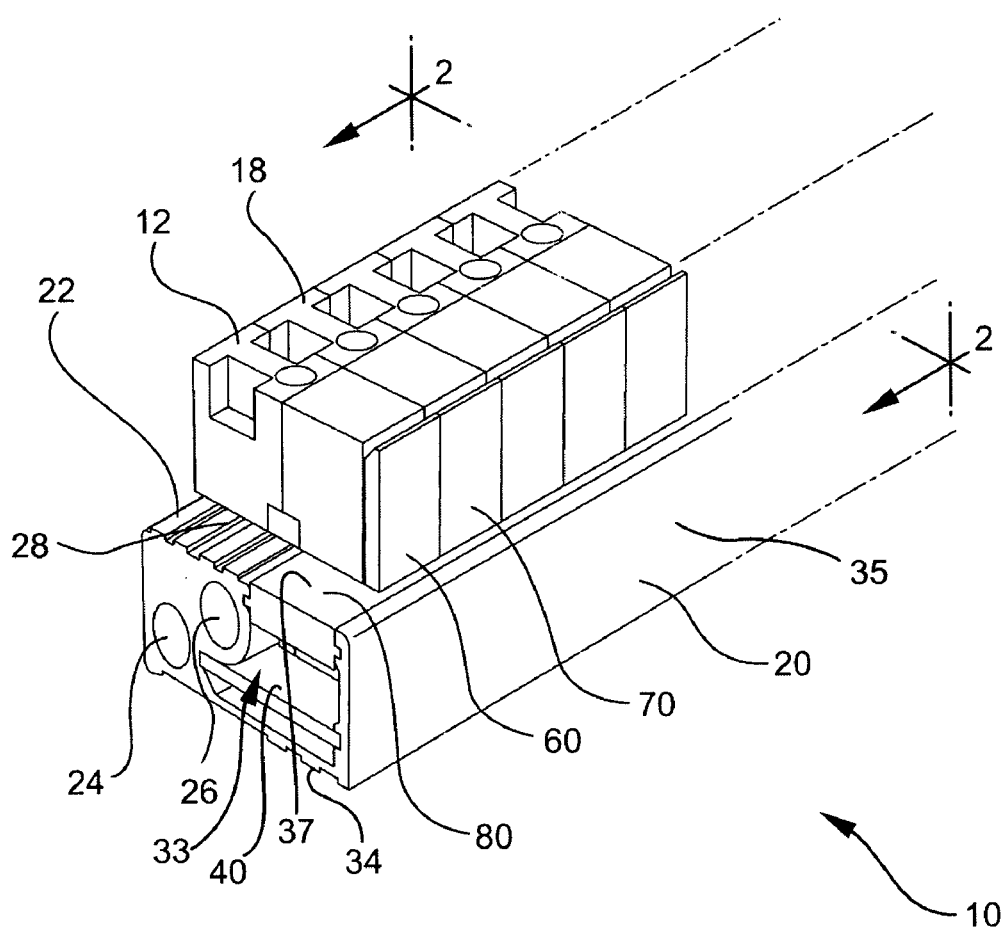
FIG. 1 is a top perspective view of the present invention.
Figure 2:
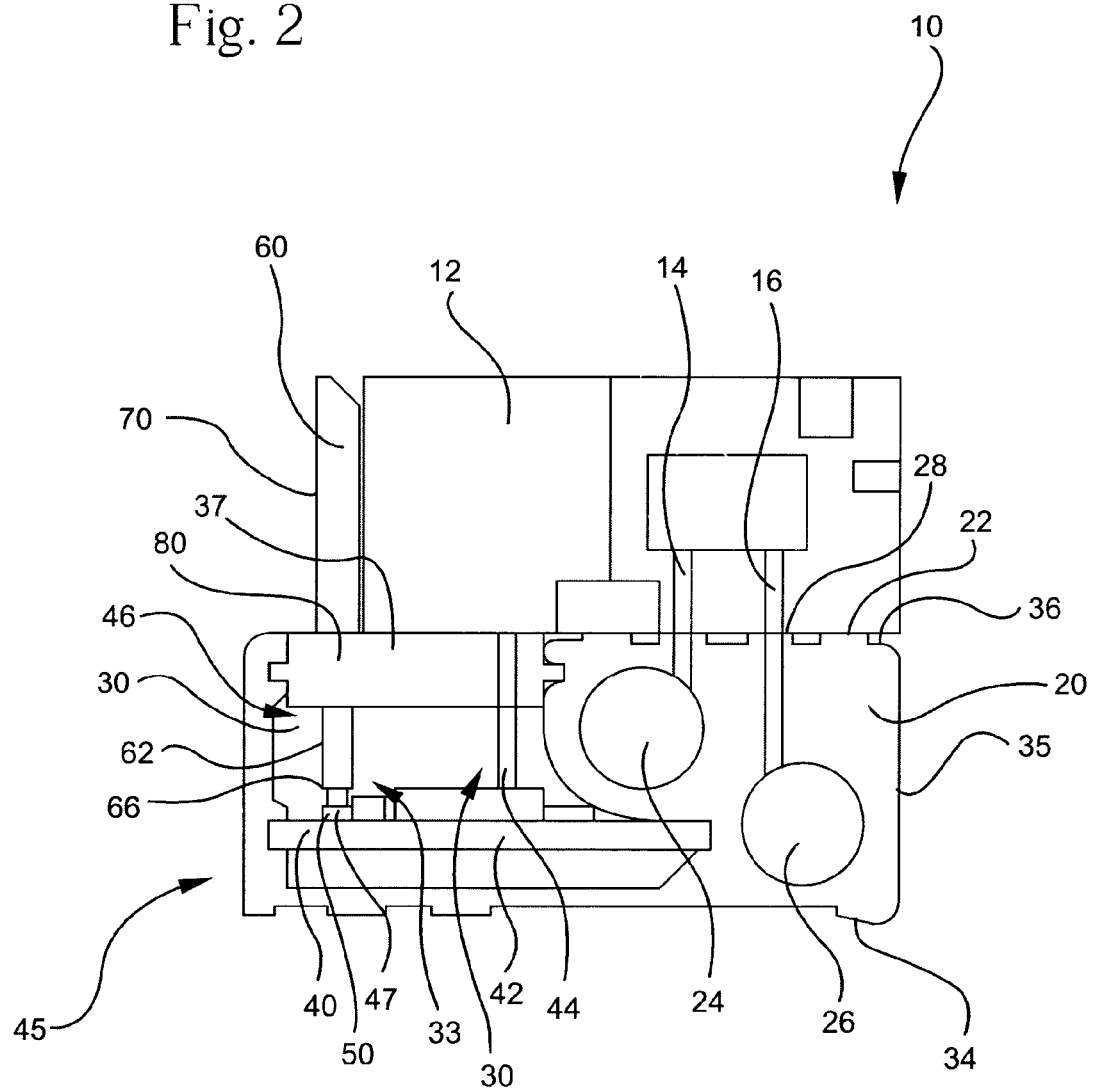
FIG. 2 is a cut-away view of the present invention along line 2—2 of FIG. 1.

Referring to FIGS. 1 and 2, a perspective view of a preferred embodiment of the fluid power assembly 10 is shown. The fluid power assembly 10 includes at least one valve 12 connected to a control assembly 40. The control assembly 40 also includes a visual indicator 46 and a light pipe 60 which facilitates viewing of the activation of the valve 12. In a preferred embodiment, the light pipe 60, control assembly 40, and the valve 12 can be positioned in close proximity to one another. Multiple valves 12 can be positioned on a valve manifold 20 adjacent each other to form a valve bank 34.

The valve 12 is used to control the flow of fluid from an inlet port 14 to an outlet port 16. It is envisioned that any type of valve 12 can be used. An electrically operated valve or similar valve that is known in the art can be used. The electrically operated valve can be attachable to a manifold or sub-base.

A manifold 20 may be used so that multiple valves 12 can be positioned in close proximity to one another. The manifold 20 can have at least one valve mounting station 28 which allows for the selective attachment of at least one valve 12 to the valve manifold 20. The manifold 20 provides a common pressure inlet port 24 that is fluidly connected to the valve 12. The manifold may also provide a common outlet port 26. In a preferred embodiment, the manifold 20 can have discrete outlet ports 26 for each valve 12 attached to the manifold 20. In an alternative embodiment (not shown) the outlet ports 26 can be located on the actual valves 12.

The manifold 20 may have a substantially rectangular shape with a base 34 parametrically bounded by four upstanding side walls 35 to form a substantially rectangular box. The upstanding walls 35 are connected to an upper wall 36 which is substantially parallel and similar in size to the base 34. The side walls 35, base 34 and upper wall 36 form the manifold 20 and define an interior space 33 used to house various components of the fluid power assembly 10. The upper wall 36 further includes a longitudinally extending slot 37 along the upper wall 36 which is used to accommodate a light pipe holder 80. The upper wall 36 has an upper surface 22 which has at least one valve mounting station 28. It is envisioned that multiple valve mounting stations 28 can be positioned adjacent each other on the upper wall 36 along the longitudinal axis of the manifold 20. In a preferred embodiment the mounting stations 28 are positioned substantially parallel and adjacent the slot 37. The manifold 20 further includes below the surface of the upper wall 36 a control assembly cavity 30. Control assembly cavity 30 is positioned within the interior space 33 of the valve manifold. It is also envisioned that the control assembly cavity 30 is positioned below the upper surface 22 of the upper wall 36 and that the slot 37 forms part of the control assembly cavity 30. The control assembly cavity 30 provides a housing for control assembly 40.

Figure 3:
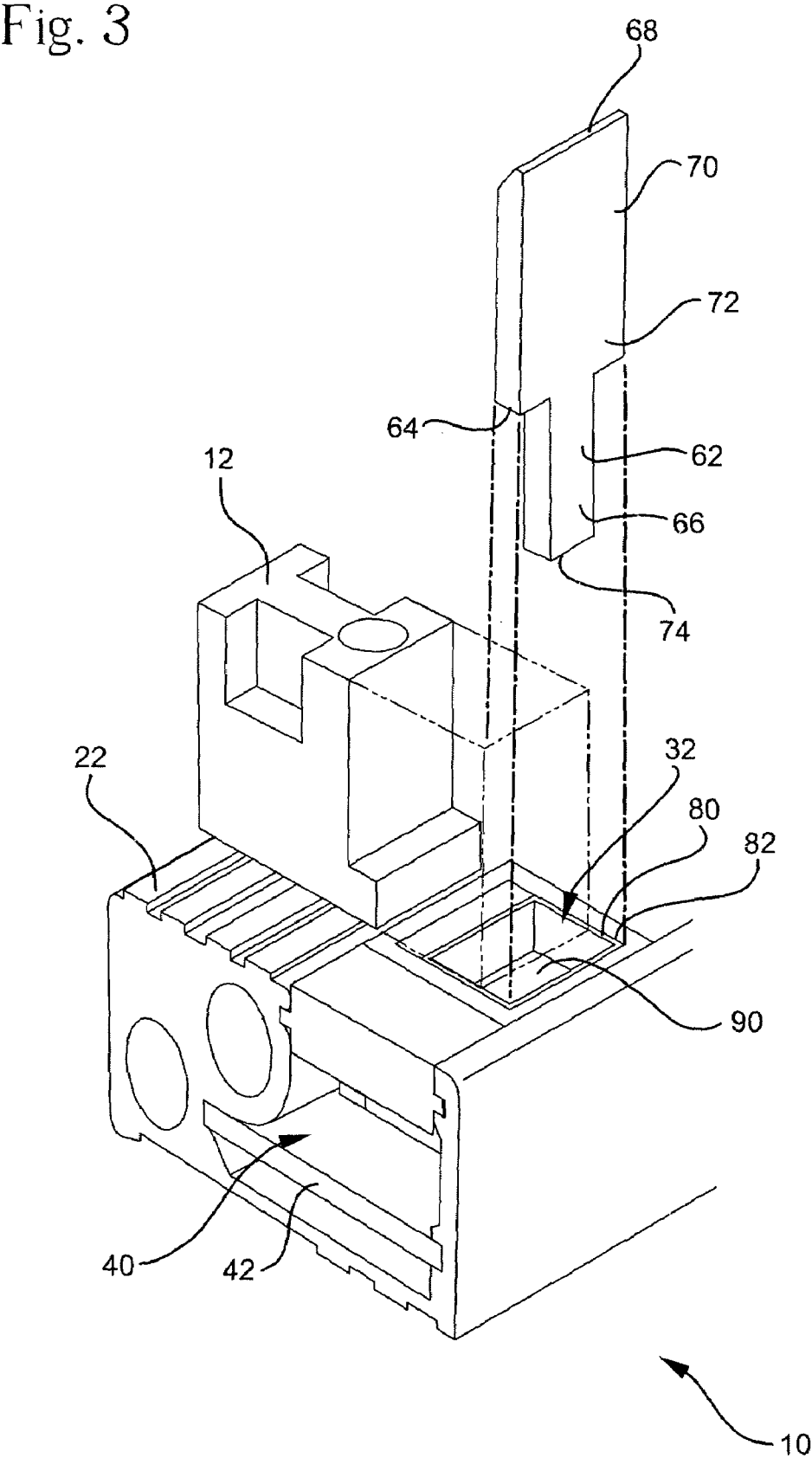
FIG. 3 is a partial exploded perspective view of the light pipe of the present invention.

Referring to FIGS. 2 and 3, a control assembly 40 allows for the controlled actuation of the valve 12. In a preferred embodiment, the control assembly 40 includes a printed circuit board 42 which has discrete stations 45 for controlling each individual valve 12. Each of the stations 45 may be electrically connected to a specific valve 12 using contact device 44. The contact device 44 can be a pin and socket type connection. However, any type of electrical connection can be used. Although the circuit board 42 may have discrete stations 45 it is envisioned that all the stations 45 are contained in a one piece circuit board 42 to facilitate the manufacture of the control assembly 40. Each station 45 preferably includes a visual indicator 46 for providing a signal when a valve is activated. The visual indicator 46 may include a light source 47 in the form of a LED that can be connected to the circuit board 42 to facilitate the manufacturer of the control assembly 40. The control assembly 40 is housed within the valve manifold 20 in the control assembly cavity 30 thereby providing a compact and efficient design. The control assembly may be connected to a valve controller (not shown) which selectively actuates the valves 12 in a predetermined manner. Such controllers are known in the art and may include a programmable logic controller (PLC), or any of a number of devices used for switching activated valve devices.

In a preferred embodiment, the light source 47 is a light emitting diode (LED) 50 mounted directly on PC board 42. However, since the LED can be located directly on the circuit board 42 and below the upper surface 22 of the upper wall 36, it may not be directly visible by the user. The LED 50 for each valve is preferably positioned directly below the longitudinal slot 37 in the upper wall 36 of the valve manifold 20.

Figure 4:
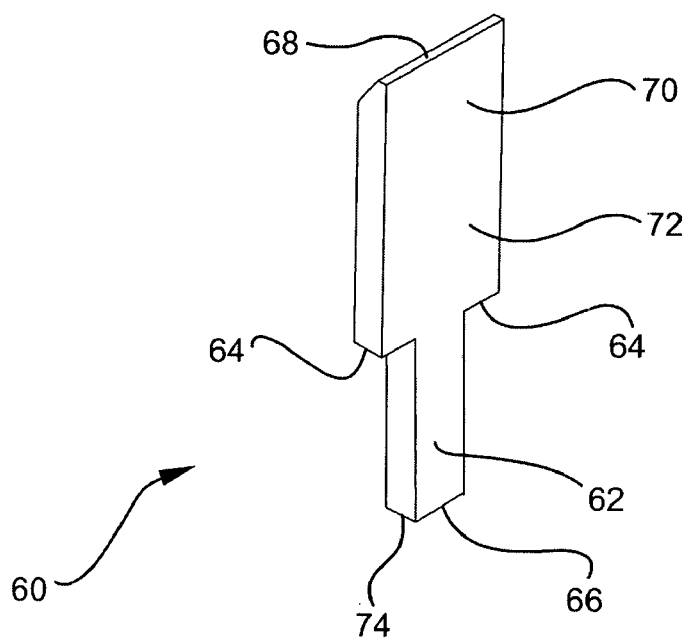
FIG. 4 is a perspective view of the light view of the light pipe of the present invention.

In order to permit the LED 50 to be easily seen by the user a light pipe 60 can be used. Referring to FIGS. 3 and 4, the valve assembly 10 further includes a light pipe 60. The light pipe 60 provides a specific path that the light can travel through so that it can be seen on a display portion 70 which is independent of from the valve body. The light pipe 60 has a stem portion 62 having a first end 74 that is positioned adjacent or in direct contact with the LED 50. The light emitted from the LED 50 travels into the light pipe 60 through the first end 74 to an upper display portion 70. The stem portion 62 forms a lower portion 66 of the light pipe 60 and is attached to an upper display portion 70. The display portion 70 preferably has a surface area which is larger than the surface area of the LED 50 so that the user can easily see that the LED 50 is illuminated. The stem portion 62 is connected to the upper display portion 70 at shoulder junction 64. Shoulder junction 64 preferably extends substantially perpendicular from the stem portion 62. The upper display portion 70 has an outer profile 68 defining the perimeter of the upper display portion 70. It is envisioned that the outer profile 68 can be any shape that the user desires. For exemplary purposes the display portion 70 has a square shape. The light pipe 60 can also be made in a variety of colors so that the user can quickly differentiate the specific valve from the surrounding valves. In a preferred embodiment the light pipe can be made of an acrylic material or any similar material. The lower portion 66 and the upper display portion 70 are preferably formed as a one piece unit of a translucent or transparent material which is capable of transmitting light along its length.

Figure 5:
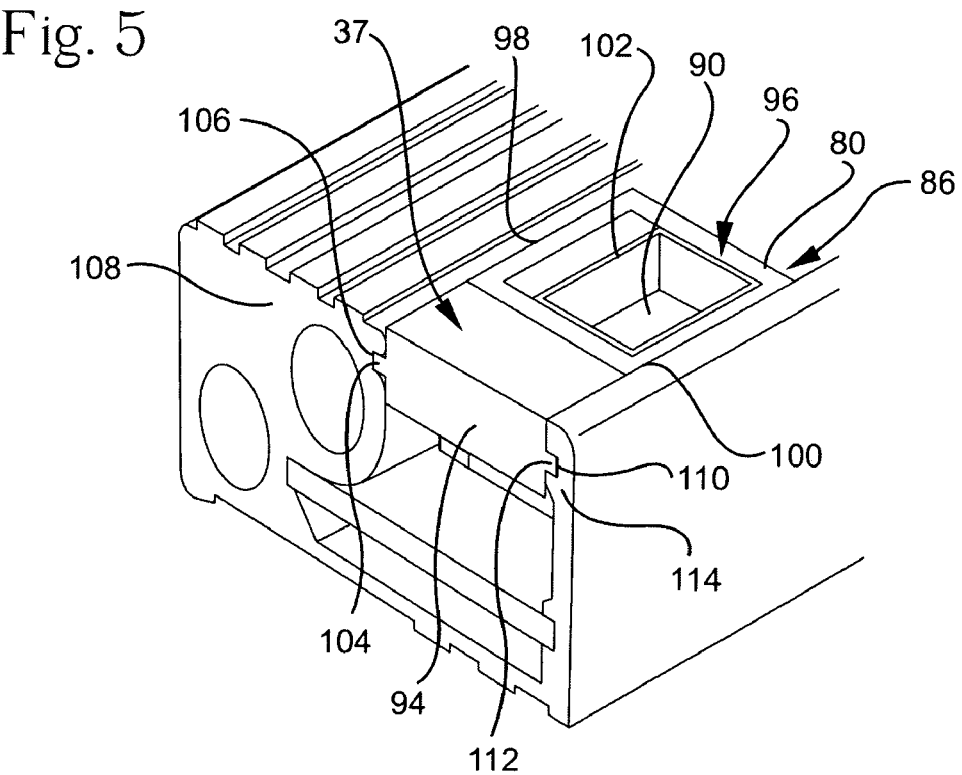
FIG. 5 is a perspective view of the light pipe holder of the present invention.

Referring to FIGS. 3 and 5, a holder 80 may be used to hold the light pipe 60 in place. The holder 80 is attached to the valve manifold 20. In a preferred embodiment, the longitudinally extending slot 37 in the manifold 20 receives the holder 80. The holder 80 may interlock with the valve manifold 20 to become an integral part of the valve manifold 20. The holder 80 has a first wall 94 and an oppositely positioned second wall 96 which are connected by a substantially perpendicular third wall 98 and a fourth wall 100 to create a rectangular or square configuration. The holder 80 further includes a fifth wall 102 positioned substantially parallel and in closer proximity to the third wall 98 than to the fourth wall 100. The first wall 94, second wall 96, third wall 98, and fifth wall 102 combine to form a light pipe receiving aperture 90. The light pipe receiving aperture 90 is sized to accommodate the stem portion 62 of the light pipe and the shoulder portion 64 of the light pipe. In a preferred embodiment, the light pipe receiving aperture 90 is sized to create a friction fit or snap fit or interference fit with the side walls or outer profile of the stem portion 62. The light pipe 60 is held in place by the friction fit, however, it can easily be removed by the user when needed for replacement or maintenance without tools.

The holder 80 is held in the manifold 20 using a groove and rib fitting and is positioned in the manifold slot 37 to form a portion of the upper surface 22 of the manifold 20.

The holder 80 has on the third wall 98 an outwardly extending first rib 104 which is sized to fit within a corresponding first groove 106 in a first side wall 108 of the slot 37. The opposite fourth side wall 100 includes a second rib 110 that is sized to fit into a corresponding second groove 112 in a second sidewall 114 of the slot 37. The first rib and groove configuration and second rib and groove configuration allow the holder 80 to be frictionally held within the valve manifold 20 to form a light pipe mounting station 28 on the valve manifold 20.

An advantage of the present invention is that should a valve 12 or light pipe 60 need to be removed, the individual light pipe 60 or valve 12 can be removed from the valve manifold 20 without the need to interfere with any of the other valves or components. Should one of the light pipes 60 need service, the individual light pipe 60 can be removed by hand without tools and replaced with a new light pipe 60 without having to deactivate the individual valve 12 or the entire valve bank 34. In the alternative, if a particular valve 12 needs to be replaced, the damaged valve 12 can be removed by the user without having to interfere with the light pipe 60 or the control assembly 40. Further, the remaining valves 12 in the valve bank 34 do not have to be deactivated, since each individual valve 12 functions independent one another. Further, since each individual valve 12 has its own individual light pipe 60, the replacement of light pipes can all be done at different times since the removal and replacement of a particular light pipe 60 does not affect any of the other valves or light pipes.

A further advantage of the present design is that light pipes of different colors, shapes and sizes can be used to accommodate the user's particular needs. Depending on the various needs of the user, the light pipe's sizes, shapes and colors can be changed to further differentiate each valve. For example, valves which operate a specific aspect of a machine could be yellow and valves which operate another aspect of the machine could be red. The different colored light pipes would assist in the maintenance and troubleshooting of the machine.

While there have been described what is presently believed to be the preferred embodiment to the invention, those skilled in the art will realize that various changes and modifications may be made to the invention without departing from the scope of the invention, and it is intended to claim all such changes and modifications as fall within the true scope of the invention.

The invention claimed is:

1. A modular fluid valve assembly comprising:
   a valve, for controlling fluid flow from an inlet port and an outlet port;
   a control assembly, said control assembly removably connected to said valve to selectively activate said valve;
   a visual indicator electronically connected to said control assembly for indicating the activation of said valve, said visual indicator including a light source for emitting light when said valve is actuated; and a light pipe disposed adjacent to said light source to facilitate viewing of the activation of said light source, said light pipe being removably attached to said control assembly independent of said valve, wherein the valve is removable from the control assembly independent of said light pipe.

2. A modular fluid valve assembly as defined in claim 1, wherein said valve is an electrically operated valve.

3. A modular fluid valve assembly as defined in claim 2, wherein said control assembly includes a circuit board, said circuit board is electronically connected to said valve to selectively activate said valve.

4. A modular fluid valve assembly as defined in claim 3, wherein said light source is a light emitting diode (LED).

5. A modular fluid valve assembly as defined in claim 4, wherein said light pipe includes a stem portion positioned adjacent said LED, said stem portion is connected to a upper display portion, said upper display portion providing a visible area for light from said LED to be viewed.

6. A modular fluid valve assembly as defined in claim 5, wherein said light pipe is held in place by a light pipe holder positioned adjacent said valve.

7. A modular fluid valve assembly as defined in claim 6, wherein said light pipe holder further comprises:
   a first wall;
   an oppositely positioned and substantially parallel second wall;
   a third wall, said third wall substantially perpendicular to said first wall, said third wall connecting said first wall and said second wall;
   a fourth wall, said fourth wall positioned opposite and substantially parallel to said third wall;
   a fifth wall positioned substantially parallel and in closer proximity to said third wall than to said fourth wall; and
   a light pipe receiving aperture, said light pipe receiving aperture comprised of said first wall, second wall, third wall and fifth wall.

8. A modular fluid valve assembly as defined in claim 7, wherein said light pipe holder further includes a first rib extending outwardly from said third wall and a second rib extending outwardly from said fourth wall.

9. A modular fluid valve assembly as defined in claim 8, wherein said fluid valve assembly further includes a manifold, said manifold comprising; a base; an upstanding wall parametrically bounding and extending from said base, said upstanding wall terminating at and connected to an upper wall, wherein said upper wall is substantially parallel with said base; a control assembly cavity, said control assembly cavity forming an interior space in said manifold; at least one valve mounting station, said at least one valve mounting station located on said upper wall; and a first groove in said valve manifold upper surface and a second opposite groove spaced substantially parallel and a distance away from said first groove to create a longitudinally extending slot in said upper wall for accepting said light pipe holder.

10. A modular fluid valve assembly as defined in claim 9, wherein said control assembly is positioned in said interior space of said manifold.

11. A modular fluid valve assembly comprising:
   a manifold including at least one valve mounting station;
   at least one valve, said at least one valve having a mounting base, said mounting base being selectively attachable to said at least one valve mounting station;
   a control assembly, said control assembly electronically connected to said at least one valve to selectively control the activation of said at least one valve;
   a light pipe, said light pipe selectively removably attached to said control assembly, wherein said light pipe provides a visual indication of the activation of said at least one valve; and
   a holder located adjacent said valve mounting station, said holder providing a securing location on said manifold for positioning and retaining said light pipe.

12. A modular fluid valve assembly as defined in claim 11, wherein said manifold further includes a control assembly cavity, said control assembly cavity providing a location for housing said control assembly.

13. A modular fluid valve assembly as defined in claim 11, wherein said holder is integrally formed in said manifold.

14. A modular fluid valve assembly as defined in claim 11, wherein said light pipe is held in said holder using a selectively removable interference fit.

15. A modular fluid valve assembly as defined in claim 11, wherein said light pipe is held in said holder using a selectively removable accessible snap fit.

16. A modular fluid valve assembly as defined in claim 14, wherein said light pipe is made of a translucent acrylic.

17. A modular fluid valve assembly as defined in claim 11, wherein said control assembly comprises a printed circuit board connected to said valves, said printed circuit board including at least one visual indicator for each valve.

18. A modular fluid valve assembly as defined in claim 17, wherein said visual indicator further includes a light emitting diode (LED).

19. A modular fluid valve assembly as defined in claim 18, wherein said light pipe is positioned adjacent said LED to allow light emitted from said LED to travel through said light pipe.

20. A modular fluid valve assembly as defined in claim 19, wherein said light pipe includes a stem portion positioned adjacent said LED to allow light emitted from said LED to travel into said light, said stem portion is connected to a upper display position, said upper display position providing a visible area for light from the LED to be emitted.

21. A visual indicator for use with a valve manifold comprising:
   a light source for showing activation of a valve;
   a light pipe having a first end positioned adjacent the light source and a second opposite display position;
   a holder adapted to be attached to said manifold, said holder removably securing said light pipe separate from the valve to permit the light pipe and valve to be removed from the manifold independant of each other.

22. A visual indicator as defined in claim 21, wherein said light pipe is held in said holder using a press fit.

23. A visual indicator as defined in claim 21, wherein said light pipe is held in said holder using an accessible snap fit.

24. A modular fluid valve assembly comprising:
   a manifold having a longitudinal axis and including a first valve mounting station and a second valve mounting station positioned adjacent each other along the longitudinal axis of said manifold, said manifold having a longitudinally extending slot positioned adjacent said valve mounting stations, and a control assembly cavity located in an interior portion of said manifold;
   a first valve being selectively attached to said first valve mounting station;
   a second valve being selectively attached to said second valve mounting station;
   a control assembly electronically connected to said first valve and said second valve to selectively activate said valves, said control assembly positioned in said control assembly cavity in said manifold;
   a first visual indicator electronically connected to said control assembly for indicating the activation said first valve and a second visual indicator electronically connected to said control assembly for indicating the activation of said second valve, said first visual indicator including a first light source for emitting light when said first valve is activated and said second visual indicator including a second light source for emitting light when said second valve is activated;
   a first light pipe disposed adjacent said first light source and a second light disposed adjacent said second light source for displaying said light emitted from said first light source and said second light source; and
   a first light pipe holder located adjacent to said first valve mounting station and a second light pipe holder located adjacent to said second valve mounting station adapted for allowing selectively removable insertion of said first light pipe and said second light pipe, said first light pipe holder and said second light pipe holder being positioned in said slot in said manifold.

25. A modular fluid valve assembly as defined in claim 24, wherein said first valve and said second valve are electrically operated valves.

26. A modular fluid valve assembly as defined in claim 25, wherein said control assembly includes a circuit board, said circuit board is electronically connected to said first valve and said second valve to selectively activate said first valve and said second valve.

27. A modular fluid valve assembly as defined in claim 26, wherein said first light source and said second light source are light emitting diodes (LED).

28. A modular fluid valve assembly as defined in claim 27, wherein said first light pipe and said second light pipe includes a stem portion positioned adjacent said LED, said stem portion is connected to a upper display portion, said upper display portion providing a visible area for light from said LED to be viewed.

29. A modular fluid valve assembly as defined in claim 28, wherein said first light pipe holder and said second light pipe holder further comprise: a first wall; an oppositely positioned and substantially parallel second wall; a third wall, said third wall substantially perpendicular to said first wall, said third wall connecting said first wall and said second wall; a fourth wall, said fourth wall positioned opposite and substantially parallel to said third wall; a fifth wall positioned substantially parallel and in closer proximity to said third wall than to said fourth wall; and a light pipe receiving aperture, said light pipe receiving aperture comprised of said first wall, second wall, third wall and fifth wall.

30. A modular fluid valve assembly as defined in claim 29, wherein said first light pipe holder and said second light pipe holder further includes a first rib extending outwardly from said third wall and a second rib extending outwardly from said fourth wall.

31. A modular fluid valve assembly as defined in claim 30, wherein said slot includes a first groove in said manifold upper surface and a second opposite groove spaced substantially parallel a distance away from said first groove to form said slot for accepting said light pipe holder.

32. A modular fluid valve assembly comprising:
   a valve, for controlling fluid flow from an inlet port and an outlet port;
   a control assembly, said control assembly separately connected to said valve to selectively activate said valve;
   a visual indicator, said visual indicator being electronically connected to said control assembly for indicating the activation of said valve, said visual indicator including a light source for emitting light when said valve is actuated;
   a light pipe disposed adjacent to said light source, said light pipe being removably attached to said control assembly, wherein said light pipe facilitates viewing of the activation of said light source; and
   said light pipe being held in place by a light pipe holder positioned adjacent said valve, said light pipe holder including a first wall an oppositely positioned and substantially parallel second wall and a third wall, said third wall being substantially perpendicular to said first wall, said third wall connecting said first wall and said second wall; a fourth wall, said fourth wall positioned opposite and substantially parallel to said third wall; a fifth wall positioned substantially parallel and in closer proximity to said third wall than to said fourth wall; and a light pipe receiving aperture, said light pipe receiving aperture comprised of said first wall, second wall, third wall and fifth wall.

33. A modular fluid valve assembly comprising:

a manifold including at least one valve mounting station;

at least one valve, said at least one valve having a mounting base, said mounting base being selectively attachable to said at least one valve mounting station;

a control assembly, said control assembly electronically connected to said at least one valve to selectively control the activation of said at least one valve;

a light pipe, said light pipe selectively removably attached to said control assembly, wherein said light pipe provides a visual indication of the activation of said at least one valve; and a holder integrally formed in said manifold, said holder providing a securing location on said manifold for positioning and retaining said light pipe.

34. A modular fluid valve assembly comprising:

a manifold including at least one valve mounting station;

at least one valve, said at least one valve having a mounting base, said mounting base being selectively attachable to said at least one valve mounting station;

a control assembly, said control assembly electronically connected to said at least one valve to selectively control the activation of said at least one valve;

a light pipe, said light pipe selectively removably attached to said control assembly, wherein said light pipe provides a visual indication of the activation of said at least one valve; and a holder providing a securing location on said manifold for positioning and retaining said light pipe, and said light pipe is held in said holder using a selectively removable interference fit.

35. A modular fluid valve assembly comprising:

a manifold including at least one valve mounting station;

at least one valve, said at least one valve having a mounting base, said mounting base being selectively attachable to said at least one valve mounting station;

a control assembly, said control assembly electronically connected to said at least one valve to selectively control the activation of said at least one valve;

a light pipe, said light pipe selectively removably attached to said control assembly, wherein said light pipe provides a visual indication of the activation of said at least one valve; and a holder providing a securing location on said manifold for positioning and retaining said light pipe, and said light pipe is held in said holder using a selectively removable accessible snap fit.

* * * * *